US008890098B2

(12) United States Patent
Mackinnon et al.

(10) Patent No.: US 8,890,098 B2
(45) Date of Patent: Nov. 18, 2014

(54) ULTRAVIOLET FLOOR CURING DEVICE EMPLOYING OFFSET WHEEL ARRANGEMENT

(75) Inventors: Andrew J. Mackinnon, Garden Grove, CA (US); Dick Amen, Westminster, CA (US)

(73) Assignee: Jelight Company, Inc., Irvine, CA (US)

( * ) Notice: Subject to any disclaimer, the term of this patent is extended or adjusted under 35 U.S.C. 154(b) by 827 days.

(21) Appl. No.: 12/803,985

(22) Filed: Jul. 12, 2010

(65) Prior Publication Data

US 2012/0009351 A1    Jan. 12, 2012

(51) Int. Cl.
*B62D 61/10*    (2006.01)
*B05D 3/06*    (2006.01)

(52) U.S. Cl.
CPC ............... *B05D 3/067* (2013.01); *B62D 61/10* (2013.01)
USPC ......................................... 250/504 R; 180/22

(58) Field of Classification Search
USPC .......... 250/504 R, 497.1; 180/21, 22; 280/29, 280/491.3, 137.502; 427/487, 508
See application file for complete search history.

(56) References Cited

U.S. PATENT DOCUMENTS

| | | | | |
|---|---|---|---|---|
| 2,525,546 A * | 10/1950 | Harris | | 239/664 |
| 2,716,531 A * | 8/1955 | Johnson | | 248/51 |
| 2,795,914 A * | 6/1957 | Smith | | 56/11.2 |
| 4,475,613 A * | 10/1984 | Walker | | 180/22 |
| 4,802,549 A * | 2/1989 | Martinez | | 180/322 |
| 5,363,938 A * | 11/1994 | Wilson et al. | | 180/233 |
| 5,378,095 A * | 1/1995 | Shultz | | 410/151 |
| 5,386,742 A | 2/1995 | Irikura et al. | | |
| 5,651,749 A * | 7/1997 | Wilson et al. | | 475/221 |
| 5,752,871 A * | 5/1998 | Tsuzuki | | 446/457 |
| 5,947,051 A | 9/1999 | Geiger | | |
| 6,015,019 A * | 1/2000 | Grimes et al. | | 180/324 |
| 6,096,383 A | 8/2000 | Berg et al. | | |
| 6,538,258 B1 | 3/2003 | Rau et al. | | |
| 6,761,127 B2 | 7/2004 | Field et al. | | |
| 6,764,719 B2 | 7/2004 | Russell et al. | | |
| 7,562,728 B1 * | 7/2009 | Voigt | | 180/65.1 |
| 8,458,923 B2 * | 6/2013 | Mackinnon et al. | | 250/504 R |
| 2002/0175299 A1 * | 11/2002 | Kanie et al. | | 250/504 R |
| 2003/0168905 A1 * | 9/2003 | Chung | | 301/36.2 |
| 2005/0209736 A1 * | 9/2005 | Kawagoe | | 700/245 |
| 2006/0005765 A1 * | 1/2006 | Davidson | | 118/323 |
| 2008/0035405 A1 * | 2/2008 | Oberhausen et al. | | 180/245 |
| 2011/0179759 A1 * | 7/2011 | Goman et al. | | 56/253 |

* cited by examiner

*Primary Examiner* — Brooke Purinton
(74) *Attorney, Agent, or Firm* — Smyrski Law Group, A P.C.

(57) ABSTRACT

A floor curing apparatus is disclosed, including a housing, an ultraviolet lamp, and an offset wheel arrangement including a pair of inner drive wheels configured to rotate and alternately be driven about a first common axis and a pair of outer drive wheels configured to rotate and alternately be driven about a second common axis. Each of the pair of outer drive wheels are positioned a first predetermined distance outward from each of the pair of inner drive wheels, and the first axis is offset from said second axis by a second predetermined distance. The floor curing apparatus also includes a shutter device a linear actuator configured to drive a support element in a direction away from the ultraviolet lamp, the support element affixed to a plurality of rods configured to draw the shutter device away from the ultraviolet lamp.

19 Claims, 7 Drawing Sheets

ULTRAVIOLET FLOOR CURING DEVICE EMPLOYING OFFSET WHEEL ARRANGEMENT

BACKGROUND OF THE INVENTION

1. Field of the Invention

The present invention relates generally to the art of curing floors, and more specifically an apparatus for enhanced curing of floors using ultraviolet radiation.

2. Description of the Related Art

Various types of flooring exists in industrial, manufacturing, and warehouse applications. Certain surfaces can be cured using a photo-initiated or photosensitive sealant material. For example, an ultraviolet (UV) 'sealer' is applied atop the floor surface designed to protect the surface from wear and tear due to foot traffic, motorized traffic, spills, and so forth. For certain floor types, it may be highly desirable to apply UV sealers specially formulated for hardwood, stone, tile, medium density fiberboard, particle board, plywood, vinyl materials, or concrete flooring.

For example, to seal the concrete floor a urethane-based copolymer UV material may be applied to a floor, such as a concrete floor, and cured. Other floor material types may respond well to treatment with photo-initiated sealant materials including acrylated and cationic epoxies, urethanes, polyesters, and environmental protection agency zero volatile organic compound formulas.

Many of today's UV sealant material formulations require a long period of time, e.g. ranging from several hours to days, to fully cure a surface such that the surface is ready for use. In situations where the area being sealed incurs a great deal of traffic or provides an emergency exit pathway, extensive down time while the sealant is curing is highly undesirable.

Various devices are currently available to facilitate the curing and sealing of UV light sensitive coatings applied to a floor surface. In general, such curing machines include a UV lamp, a reflector, and a power source housed in a moveable and portable frame. The device is positioned over the floor surface whereupon radiation provided from the UV lamp is directed to the coated surface. The frame may be manually pushed across the floor surface, and in certain instances, mechanized wheels power and propel the frame forward. Such machines typically power a UV light source at a small distance above the surface, from a few inches to a foot, whereby adjusting the height of the frame away from the surface can in certain instances reduce the UV radiation applied to the coating. Materials requiring significant radiation for curing may require operation of such a machine and light source a small distance from the floor to adequately cure the surface.

Today's designs may be problematic when operated at close distances, where a portion of the machine can come in contact with the floor and/or uncured UV coating material.

Contact with the floor surface causes current machine designs to perform inadequately over large floor anomalies such as expansion joints. During the transition over the expansion joint, parts of current floor curing machine designs typically come into contact with the floor and the uncured floor coating surface. Contact in this manner damages the uncured photo-initiated coating and can damage the machine, resulting in the need to re-apply the coating and/or a significant increase in cost and time to complete the floor curing process.

Additionally, such machines use various devices to restrict application of UV radiation while the machine is warming up. Previous designs have employed designs such as a complex shutter arrangement that mechanically opens using a set of hinges. This type of design can become clogged or fouled with dirt, dust, or other contaminants and cease operating properly.

Further, certain machine designs employ cables for power. These cables can become entangled in the machine, or can be tripped over by the operator. Additionally, certain machines are difficult to store, particularly in small places. Capability to reduce the overall dimensions of the unit can in certain instances be highly beneficial.

It would therefore be useful to provide a floor curing machine design that overcomes the drawbacks associated with previous machines.

SUMMARY OF THE INVENTION

According to one aspect of the present design, there is provided a floor curing apparatus is disclosed, including a housing, an ultraviolet lamp, and an offset wheel arrangement including a pair of inner drive wheels configured to rotate and alternately be driven about a first common axis and a pair of outer drive wheels configured to rotate and alternately be driven about a second common axis. Each of the pair of outer drive wheels are positioned a first predetermined distance outward from each of the pair of inner drive wheels, and the first axis is offset from said second axis by a second predetermined distance. The floor curing apparatus also includes a shutter device a linear actuator configured to drive a support element in a direction away from the ultraviolet lamp, the support element affixed to a plurality of rods configured to draw the shutter device away from the ultraviolet lamp.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present design is a floor curing apparatus comprising an irradiator assembly, reflector component, shutter device, cooling fans, in combination with a power supply and control console components. The assemblies, components, and devices are affixed to a wheel driven frame where the wheels are typically employed over a smooth surface, e.g. hardwood, stone, tile, and vinyl materials or concrete floor, where the surface has been treated with photo-initiated material. The driving wheels are arranged in two pairs involving an outer pair and inner pair of wheels, where the outer pair of drive wheels is linearly offset from the inner pair of drive wheels. In this arrangement the wheel offset design enables the floor curing machine to transition over large expansion joints smoothly while operating at a constant speed. Certain locking bearings are employed in the offset wheels to facilitate movement of the machine.

Additionally, the wheel driven frame is configured with two linear slides arranged to guide the vertical movement of the UV lamp/irradiator and maintain parallelism between the UV lamp and the floor surface at all times.

The drive wheels of the present design are arranged in two pairs. A pair of outer drive wheels is positioned in front of a pair of inner drive wheels offset by a pre-defined distance, with each outer wheel sharing a first common axis and each inner wheel sharing a second common axis. The two pairs of offset drive wheels propel the apparatus forward when a control lever is engaged. Each drive wheel includes a pair of clutch bearings configured for transferring the primary driveshaft rotational energy when engaged. The wheel driven frame may allow a user to move the entire apparatus back and forth or in a turning motion during general use.

The user may operate the present design using a hand lever located on the handlebar to engage the motor enabling the machine to be propelled forward. Each drive wheel includes two clutches or clutch bearings, where the first clutch is arranged to operate on the on the right side of the wheel and the second clutch operates on the left side of the wheel. During operation the user may control the engagement of the right side wheel clutches and the left side wheel clutches. Applying equal and uniform force or pressure on the handlebar may engage both clutches equally and move the apparatus in a straightforward direction. Applying unequal force or pressure across the handlebar by means of applying either a left or right force to the handlebar may allow either the left side or right side clutch bearings to slip, or disengage, respectively.

The present dual clutch bearing driving wheels arrangement enables the machine to change direction while maintaining a forward direction by allowing the clutch bearings to slip in response to operator input from the handlebar. The operator may apply a force at the handlebar to direct the apparatus left or right.

In a similar manner, the user may select irradiator output, for example the number of watts of UV power, handlebar position, irradiator assembly height used to raise and lower the assembly relative to the floor surface, and the opening and closing of a shutter device.

The floor curing apparatus shutter device enables control of the energy or radiation exposure delivered to the flooring surface emitted from the irradiation source, e.g. mercury ultraviolet (UV) light. The shutter device may include a linear actuator, such as a piston arrangement, configured to open and close the shutter based on input from the user selected at the control console.

When curing a particular type of floor coating material formulation, such as urethane-based copolymers applied at a particular thickness and on top of a flooring material type, such as concrete, the operator may select a straightforward direction at a speed of two feet per minute, a five-inch suspension of the irradiator assembly above the floor surface, and a lower electrical power output using a switch on the control console, causing a UV output power reduction on the order of 30 to 60 percent of full power depending on machine configuration. Such selections adjust and control the amount of exposure from the emitted UV radiation sufficient to cure the applied photo-sensitive coating material.

Electronic controls taking operator input and directing the components of the device in the manner desired are provided, and one of ordinary skill in the art would understand the operation of such a controller. For example, if X watts of UV radiation are desired, setting the controls to X watts may be an electronic setting or mechanical setting available to the user, and appropriate power may be provided to the UV light to effectuate the desired power level. Similarly, travel speed, suspension distance of the device above the floor, retraction timing of the shutter, and other values or functions may be set and effectuated using control circuitry.

In addition, the operator may adjust the handlebars via a locking device arranged to provide a fixed relationship between the handlebars and frame components by selecting from preset heights, or in a free relationship, where a free relationship represents no resistance, free moving operation. For example, one preset handlebar position may facilitate user control while curing step surfaces under a staircase, where a second preset position may facilitate storage and transportation, and additional presets afford multiple convenient handlebar positions during operation on a long flat surface.

Figure 1:
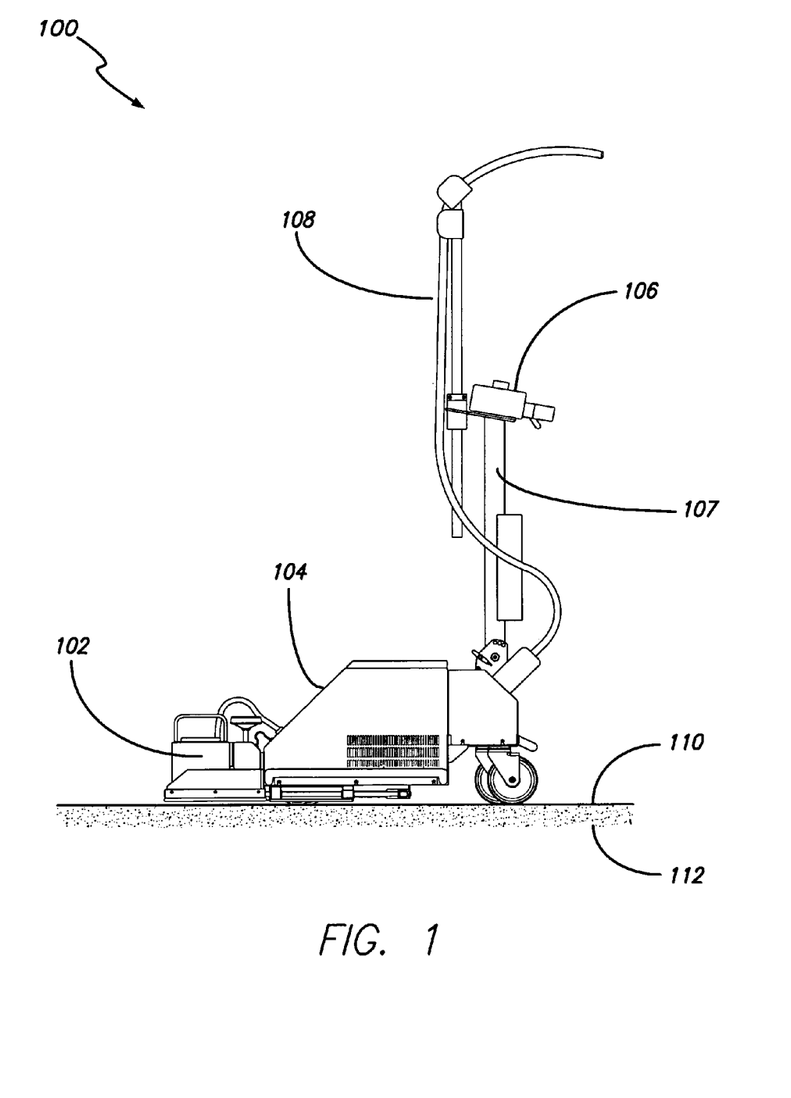
FIG. 1 is a left hand side perspective view illustrating one embodiment of the present design.
Figure 2:
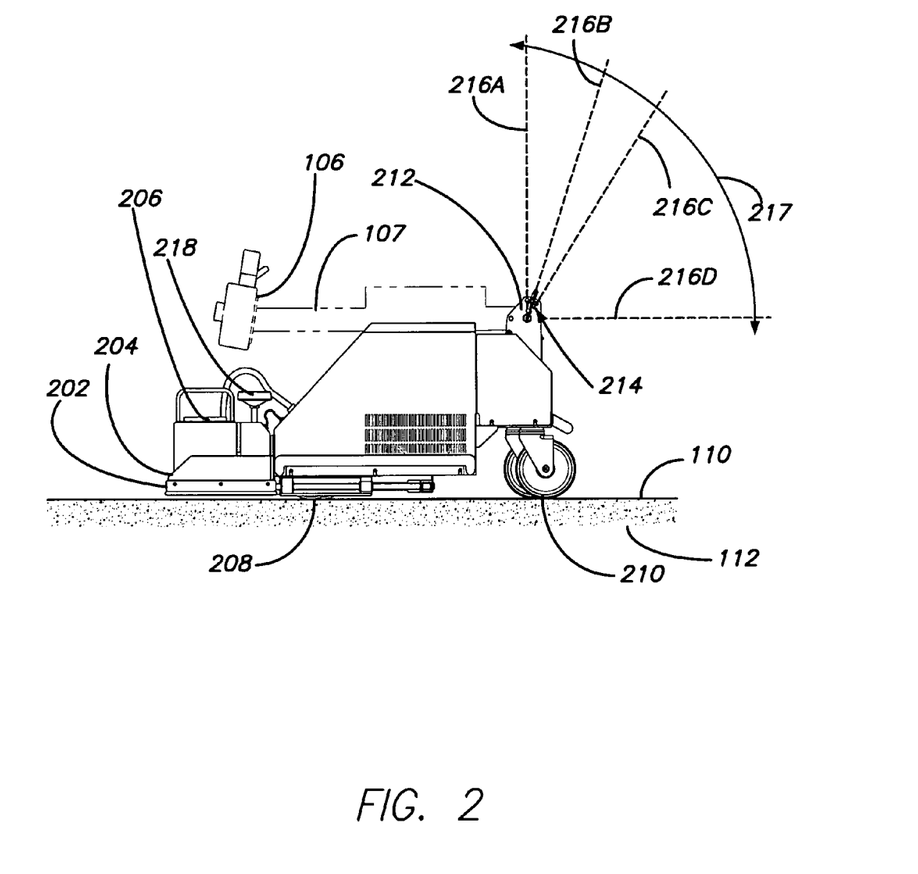
FIG. 2 illustrates major components configured to effectuate the floor curing apparatus movement functionality.

One embodiment of the floor curing apparatus is illustrated in FIGS. 1 and 2. In combination, these representations graphically depict relationships between major assemblies and subassemblies, e.g. components and devices, for an embodiment of the present design.

FIG. 1 is a left side view in accordance with the present design. Referring to FIG. 1, floor curing apparatus 100 may include an irradiator assembly 102, power supply assembly 104, control console assembly 106, handlebar 107 and cable boom 108 components. Floor curing apparatus 100 is typically positioned over photo-initiated, i.e. photo sensitive, floor coating 110 applied to smooth floor surface 112, e.g. hardwood, stone, tile, and vinyl materials, or a concrete floor.

FIG. 2 illustrates additional assemblies and subassemblies in conjunction with the components and devices illustrated in FIG. 1. The floor curing apparatus 100 may include skirt 202 configured to maintain the irradiator emissions inside irradiator frame 204. Skirt 202 extends around all sides of irradiator frame 204 forming an enclosure sufficient for containing the UV emissions between the apparatus and the floor surface. Skirt 202 may also prevent UV exposure to the operator and restrict spurious emission of radiated energy.

Irradiator frame 204 assembly may include a low-pressure mercury UV lamp component configured with a reflector device (not shown) where an array of cooling fans 206 may be positioned above irradiator assembly 102, shown in FIG. 1. The cooling fans may force air downward toward the top of the reflector device. Forced air heated by the UV lamp may exit the irradiator frame through vents positioned at the front and rear faces of the irradiator assembly.

Drive wheels 208 may be positioned behind skirt 202 and irradiator frame 204 as shown in FIG. 2. In addition to drive wheels 208, the floor curing apparatus may provide swivel caster wheels 210 at the rear of the apparatus. The drive wheels and swivel caster wheels are the only apparatus components that are desired to come in contact the coated floor surface 110.

Caster wheels 210 may similarly be offset in the manner shown with respect to the drive wheels. Three caster wheels are shown in this embodiment, but more or in limited instances fewer may be employed. In this arrangement, the offset between the forward two caster wheels axis and the rear wheel caster axis may be similar to the offset of drive wheel axes or may differ. Such an offset can enable the caster wheels to similarly roll over joints in floors such as concrete floors.

Control console 106 and handlebar 107 may connect to the floor curing apparatus using swivel mount 212 with removable locking pin 214. In this arrangement the present design may afford multiple handlebar positions during operational use. FIG. 2 illustrates the handlebars in a storage and transportation configuration. In one embodiment, the floor curing apparatus may include four preset handlebar positions that may be locked in place over a range 217 using removable locking pin 214. A first locked position occurs when the locking pin 214 is inserted in the hole located at approximately the nine o'clock position relative to the handlebar pivot point, representing the shipping position. The second locked position is where the handlebar is perpendicular to the floor, indicated by line 216A, and this hole is generally used for curing long, flat surfaces. The third locked position is approximately 17 degrees clockwise to line 216A, shown as line 216B, and insertion of the locking pin 214 in this hole can be used to cure long, flat surfaces. The fourth locking position is approximately 34 degrees clockwise to line 216A, shown as line 216C, and again, insertion of the locking pin in this hole can enable the machine to cure long, flat surfaces. Note that precise angles are not critical here, but multiple options are beneficial, and individual users may prefer certain locked positions over others for the task of curing long, flat surfaces.

A fifth non-locking position shown by a dashed line at point 216D may be used when curing in somewhat tight spaces, such as under a staircase. Rotating the handlebars through this range of motion may facilitate operation when curing underneath overhanging room elements, such as wall hung cabinets, low clearance machinery, underneath stairways, and other restricted spaces. When using the fifth position, removable locking pin 214 is typically not installed.

The irradiator, enclosed in irradiator frame 204, may be height adjustable by means of a hand wheel screw device 218. In this configuration, the operator may control the amount of UV exposure realized from the apparatus. Adjusting the apparatus height may enable the operator to adjust the amount of radiated UV energy absorbed by floor coating 110, in conjunction with other control console 106 functions such as rate of travel in feet per minute. By adjusting the irradiator above the floor surface and the rate of travel, the operator may control the amount ultraviolet emission necessary to rapidly cure the photo-initiated floor coating.

Drive Assembly and Control

Figure 3:
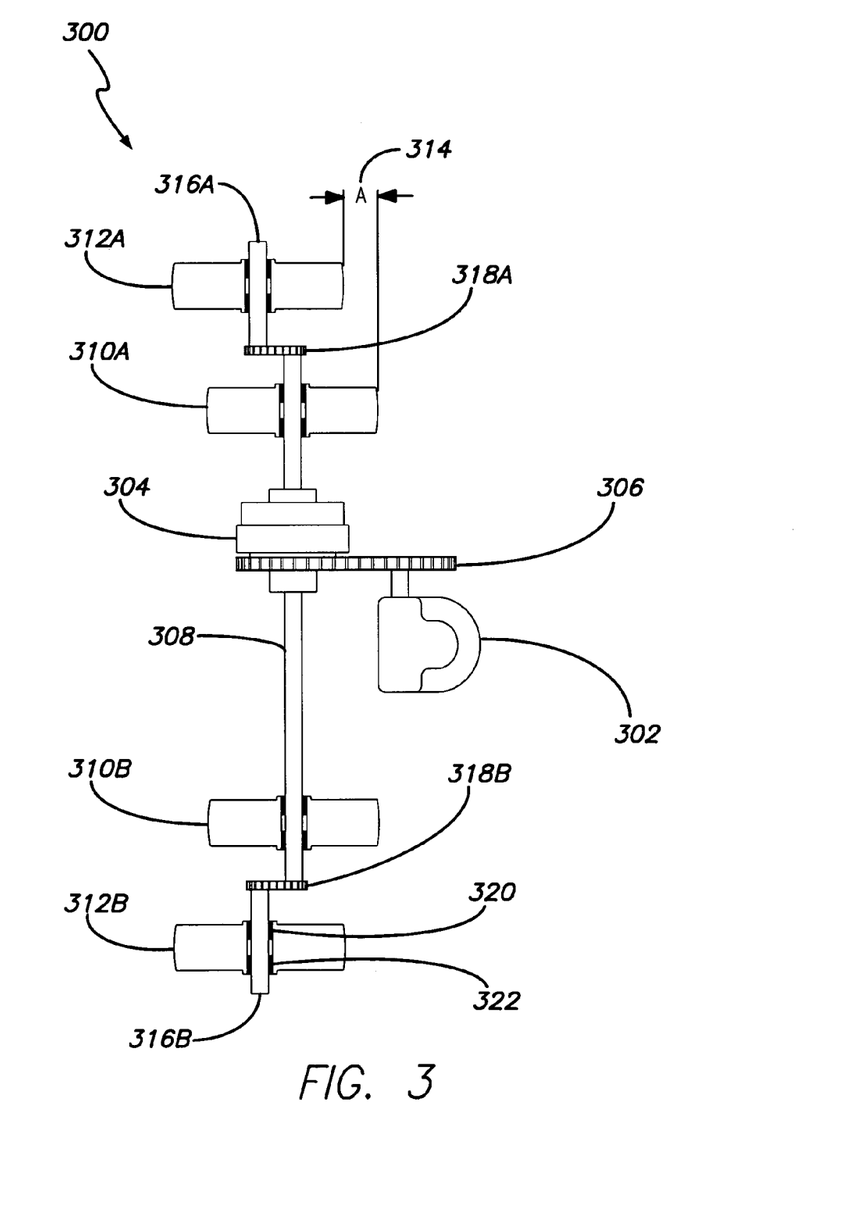
FIG. 3 is a bottom view illustrating the floor curing apparatus internal drive assembly components.

FIG. 3 is a bottom side view illustrating the floor curing apparatus internal drive assembly 300 components and devices employable with the present design. The floor curing apparatus may involve gear motor 302 and clutch 304 connected by drive chain 306 for powering primary driveshaft 308. The primary driveshaft may rotate freely within clutch 304 when drive assembly 300 is not engaged. When operating the floor curing apparatus, the user may engage clutch 304 to rotate and spin primary driveshaft 308 relative to the gear motor speed by operating a hand lever illustrated in FIG. 4B.

Drive assembly 300 may involve two pairs of drive wheels, arranged as two inner wheels and two outer wheels. The two inner drive wheels and two outer drive wheels may propel the floor curing apparatus forward when the drive assembly is engaged. The first pair of drive wheels may include a left inner drive wheel 310A and right inner drive wheel 310B. The second pair of drive wheels is linearly or axially offset from the first pair of drive wheels (310A, 310B) and may include a left outer drive wheel 312A and right outer drive wheel 312B. The inner drive wheels may be provided at a fixed position behind the outer drive wheels, i.e. axially offset. The present design may locate the inner drive wheel pair at an offset, e.g. one inch, one half inch, or some other distance, shown as distance "A" 314, behind the outer drive wheel pair.

Configuring the two pairs of drive wheels in an offset arrangement may allow floor curing apparatus 100, shown in FIG. 1, to easily transition across large expansion joints smoothly without the apparatus making contact with the floor coating material. Offsetting the drive wheel pairs in this arrangement may enable the outer drive wheels to travel over the expansion joint before the inner drive wheels reach the joint. Once the outer wheels have successfully traversed the expansion joint, the inner wheels may then follow and cross the joint. Separating the drive wheel pairs in this arrangement can prevent the apparatus skirt and other lower machine components from touching the floor coating material and floor as each drive wheel pair individually transitions across the joint.

The apparatus may tilt at a small inclined or declined angle induced while transitioning over the expansion joints where the outer wheels have transitioned over the expansion joint and the inner drive wheels have not. The small induced angle resulting from transitioning over a typical joint is limited by the offset configuration in a manner and orientation sufficient to prevent the skirt from contacting the floor surface. In addition, the apparatus may prevent skirt contact when transitioning over other obstacles such as door thresholds, gratings, and the like.

Secondary driveshaft 316A may connect to and rotate left outer drive wheel 312A and secondary driveshaft 316B may connect to and rotate right outer drive wheel 312B. In one embodiment, left secondary drive chain 318A and right secondary drive chain 318B may transfer motion from primary driveshaft 308 to the outer left and right mounted drive wheels, respectively. The secondary drive chains may connect gear sprockets fixed at each end of the primary driveshaft with gear sprockets located at the inner end of each secondary driveshaft. This transfer of rotational motion from gear motor 302 to the inner and outer drive wheel pairs may propel the floor curing apparatus in a forward direction when clutch 304 is engaged.

In a further embodiment, two clutch bearings are installed in each of the four drive wheels, as illustrated for the right outer wheel in FIG. 3. When clutch 304 is engaged, the primary driveshaft may rotate in a forward direction, where the drive wheel inner clutch bearing 320 and outer clutch bearing 322 grasp or engage the primary driveshaft and propel the apparatus forward. The drive wheel clutch bearings arrangement may slip or partially disengage during operation allowing the drive wheels to exceed the rotational speed of the primary driveshaft. Arranging clutch bearing pairs within each drive wheel may enable apparatus 100 to smoothly make various left and right directional changes while still maintaining a forward direction.

For example, applying pressure at the handlebar may direct the apparatus to the left. A left turn is realized by allowing each right side wheel clutch bearing to slip in an amount sufficient to allow the frame's right side wheels to rotate faster than the left side wheels affording the right side wheels the ability to travel a further distance when executing a left hand turn, preventing scuffing of the floor surface due to potential wheel drag.

Figure 4A:
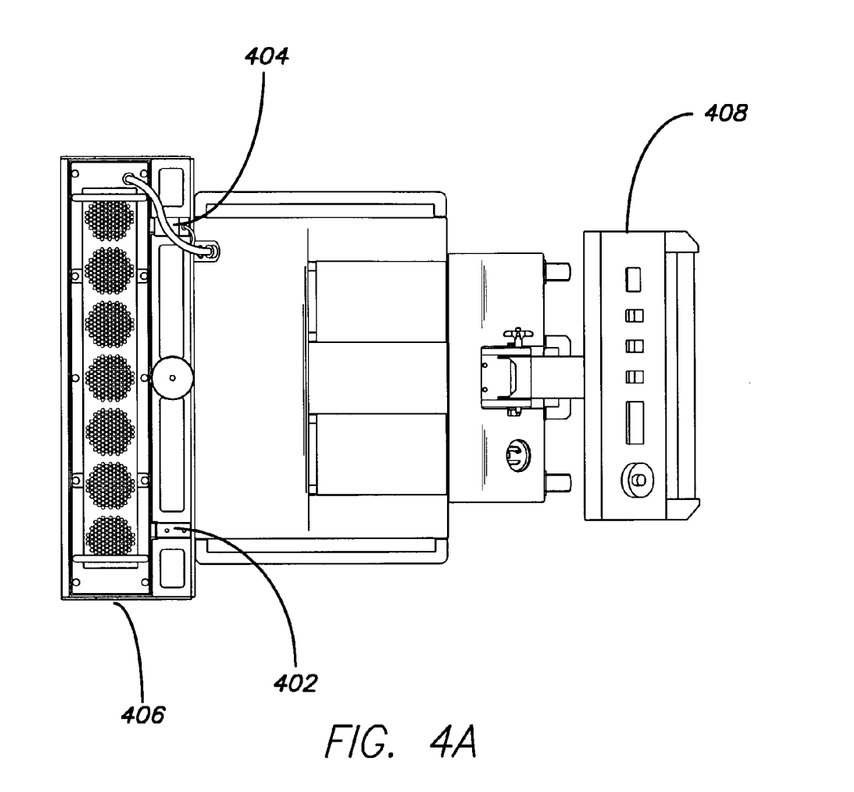
FIG. 4A is a top view illustrating two linear slide components.

FIG. 4A illustrates two linear slides, left linear slide 402 and right linear slide 404 configured to enable the irradiator to move vertically. In operation, hand wheel screw device 218 causes the irradiator to move up and down with left linear slide 402 and right linear slide 404. Height adjustment in this manner enables at least some control of the amount of radiation provided to the UV curing material covered floor surface. A top view of the control console with handlebar is illustrated at point 408.

Figure 4B:
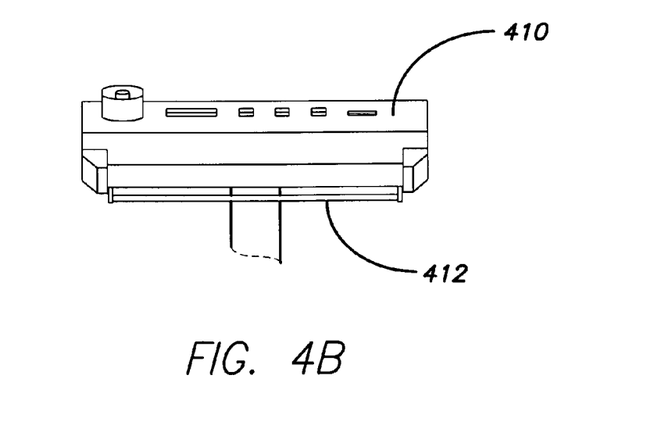
FIG. 4B is a back view illustrating the control console assembly housing the electronic devices, controls, and indication displays employable to operate the present design.

Control console assembly 410, illustrated in FIG. 4B, may include electronic devices, controls and indication displays, each facilitating machine operation. For example, electronic devices housed within the console may be configured to govern the operation of the gear motor, associated clutch, and so forth. Operation may be governed by the hand lever and switch selections located on the control console assembly, where hand lever 412 may be operated by the user to control the shutter device (described below) and drive system by squeezing the hand lever against the handlebar.

Shutter Assembly

Figure 5:
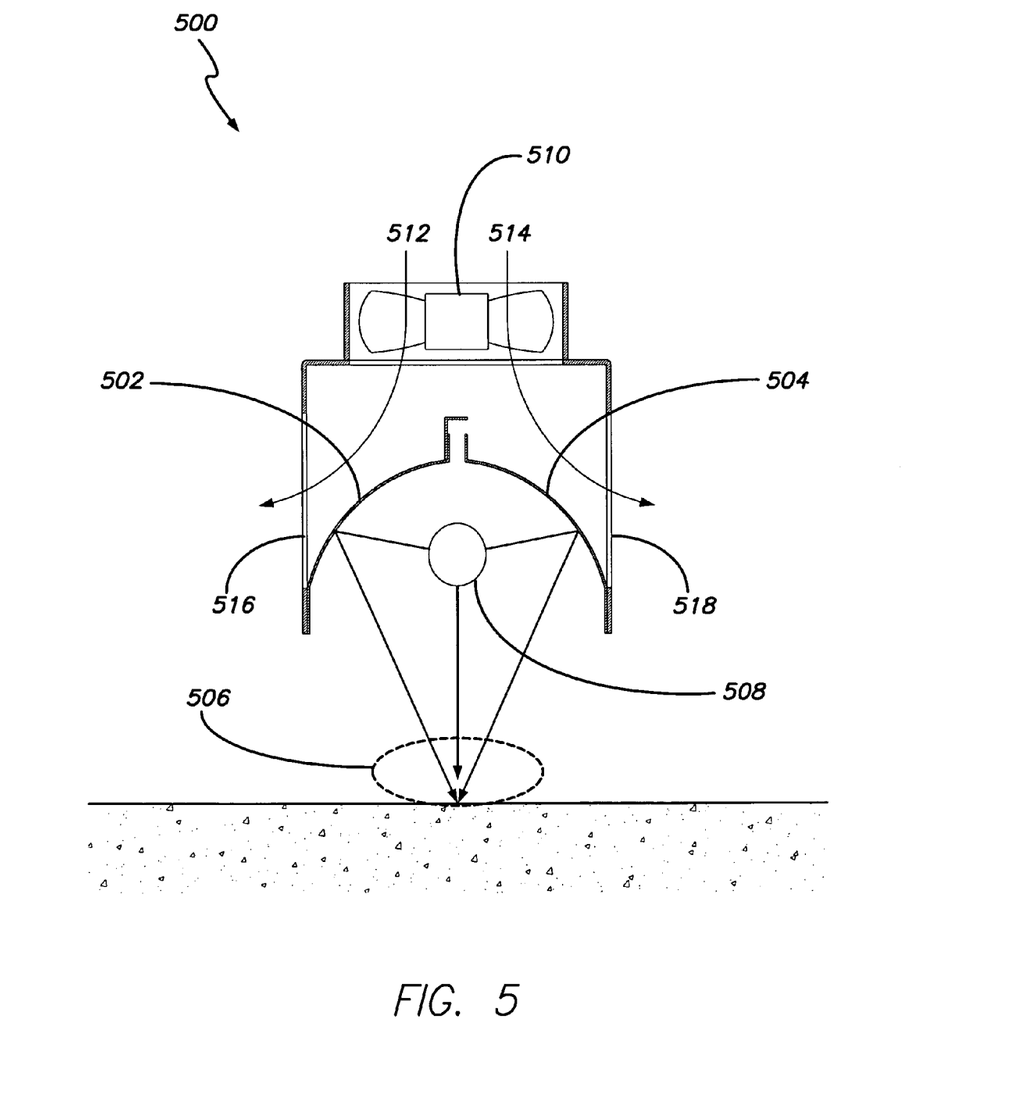
FIG. 5 is a left side internal view illustrating one embodiment for the irradiator assembly in accordance with an aspect of the present design.

FIG. 5 illustrates one embodiment of irradiator assembly 500. The floor curing apparatus may direct UV energy toward the floor coating involving a two part elliptical reflector. The irradiator assembly shown includes front elliptical reflector 502 in combination with elliptical reflector 504 to focus the UV energy at point 506 emitted from UV lamp 508. This combination of direct and reflected energy can provide an efficient means for rapidly curing floor coatings.

Cooling fans, represented in this view as cooling fan 510 where additional cooling fans are behind cooling fan 510, may force air downward to cool the top, or non-reflective side, of the reflector assembly. Air may travel in a path as shown by arrows 512 and 514. Hot air may exit the irradiator assembly through front vent 516 and rear vent 518.

Figure 6:
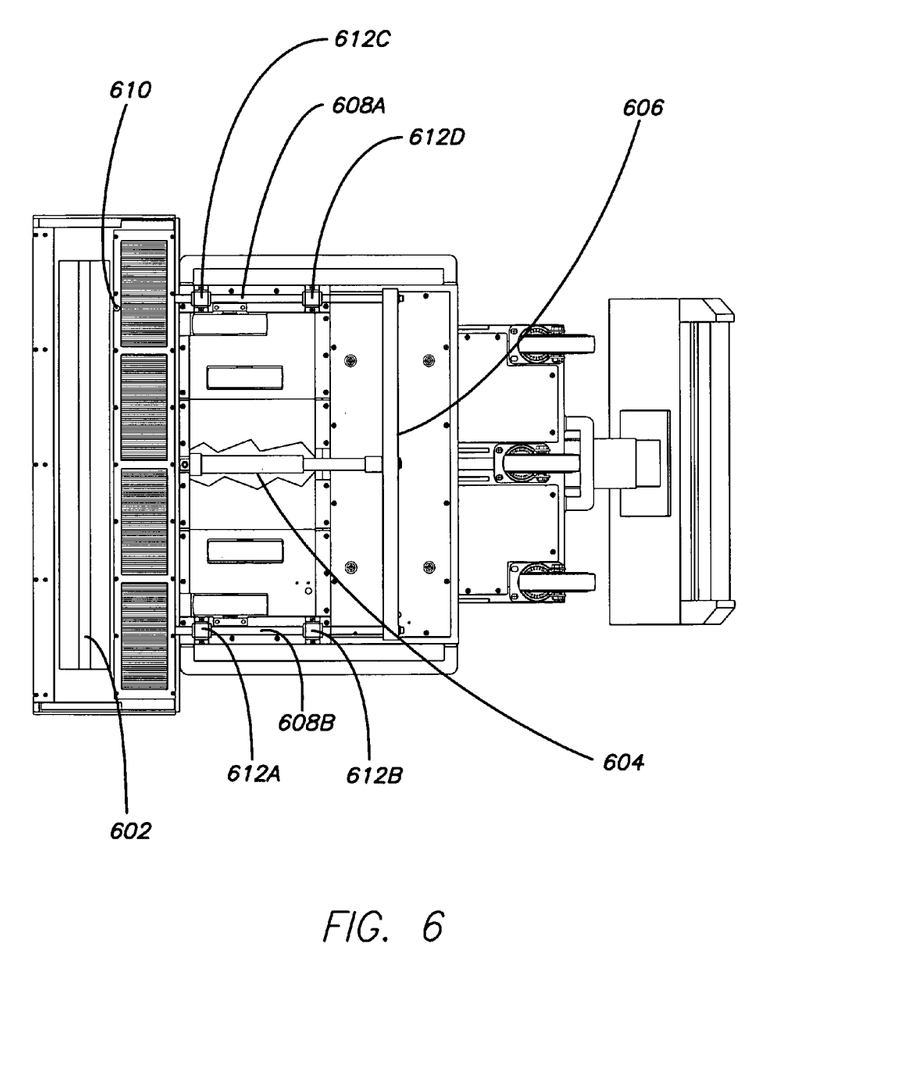
FIG. 6 is a bottom view illustrating the floor curing apparatus with the shutter in the open position allowing the UV lamp to be exposed.

FIG. 6 illustrates a bottom view of one embodiment of the present design. FIG. 6 shows a shutter assembly with a shutter device in the open position allowing UV lamp 602 to be exposed. The bottom cover is shown partially cutaway to reveal linear actuator 604. The linear actuator may extend and retract rear shutter bar 606 and a pair of guide rods, where left guide rod 608A and right guide rod 608B facilitate opening and closing shutter 610. The guide rods may be supported by four sleeve bearings 612A through 612D and may form a rigid support in combination with rear shutter bar 606.

In operation, the shutter assembly of FIG. 6 is originally oriented with the shutter 610 obscuring UV lamp 602. The system includes controls and electronics to actuate linear actuator 604. In one arrangement, the controls may be engaged by the operator and the shutter assembly initiated, while in another arrangement a timer determines that the lamp 602 has been on or operating for a predetermined amount of time sufficient to "warm up" the device.

Once the shutter assembly is activated, a signal is provided to actuate the piston in linear actuator 604, which drives the piston in the linear actuator 604 to the right in the orientation shown or applies force to rear shutter bar 606. Force applied to rear shutter bar drives the rear bar to the right in the orientation shown, causing left guide rod 608A and right guide rod 608B to move to the right in the orientation shown, through sleeve bearings 612A through 612D thus pulling or drawing shutter 610 away from UV lamp 602. Such operation enables UV radiation application at a desired time with relatively minimal risk of fouling or contacting other parts of the machine or the floor. Note that some type of lubricant, such as a common grease, may be applied to left guide rod 608A and right guide rod 608B. Simple periodic maintenance can ensure relatively high efficiency performance of the design.

Cable Boom

Figure 7:
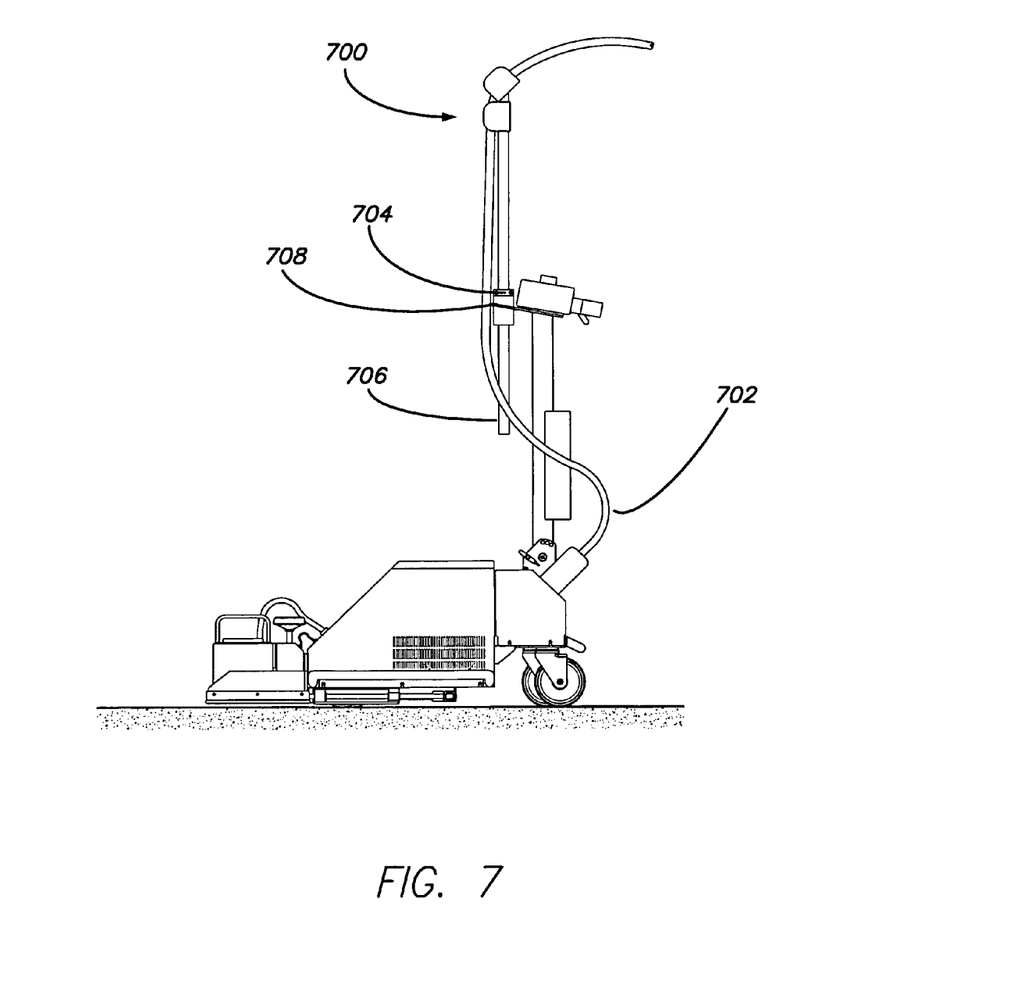
FIG. 7 is a left side view illustrating the cable boom assembly for supporting the electrical cord at an elevated height above the floor in accordance with another aspect of the present design.

Referring to FIG. 7, a cable boom assembly is illustrated for supporting electrical cord 702 at an elevated height above the floor. Collar 704 may allow for height adjustment by moving the collar to any position along boom tube 706 and collar 704 may be locked in place using a twist-locking device or other locking arrangement known in the art. The collar arrangement may permit cable boom assembly 700 to rotate through 360 degrees to prevent damage to the electrical cord as the apparatus is moved, and prevent the operator from tripping on the cord or the machine becoming entangled in the cord. The operator may remove the cable boom assembly by lifting the boom tube from boom holder 708.

There is thus provided a floor curing apparatus including a housing, an ultraviolet lamp, and an offset wheel arrangement including a pair of inner drive wheels configured to rotate and alternately be driven about a first common axis and a pair of outer drive wheels configured to rotate and alternately be driven about a second common axis. Each of the pair of outer drive wheels are positioned a first predetermined distance outward from each of the pair of inner drive wheels, and the first axis is offset from said second axis by a second predetermined distance. The floor curing apparatus also includes a shutter device a linear actuator configured to drive a support element in a direction away from the ultraviolet lamp, the support element affixed to a plurality of rods configured to draw the shutter device away from the ultraviolet lamp.

The design presented herein and the specific aspects illustrated are meant not to be limiting, but may include alternate components while still incorporating the teachings and benefits of the invention, namely a floor curing apparatus enabling movements during operation over floor anomalies based on a unique offset wheel design, and facilitating directional changes when the user applies a force or pressure to the handlebar to direct the floor curing apparatus left or right. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A floor curing apparatus comprising an irradiator source generally directed downward toward a floor and a drive assembly comprising:

a plurality of forward wheel pairs and a plurality of rear wheels, the plurality of forward wheel pairs comprising a pair of inner drive wheels and a pair of outer drive wheels;

a primary driveshaft configured to drive the pair of inner drive wheels rotating about a common first axis, wherein the primary driveshaft connects the pair of inner drive wheels; and a secondary driveshaft arrangement configured to drive the pair of outer drive wheels, the second driveshaft arrangement comprising two secondary driveshafts aligned along a common second axis, each secondary driveshaft rotated by a separate drive chain driven by rotation of the primary driveshaft;

wherein the common first axis is linearly offset from the common second axis by a first predetermined distance, and further wherein the pair of outer drive wheels are offset outward from the pair of inner drive wheels by a second predetermined distance.

2. The floor curing apparatus of claim 1, further comprising a plurality of bearings arranged with each inner drive wheel and each outer drive wheel to enable nonuniform rotation of the pair of outer drive wheels and the pair of inner drive wheels.

3. The floor curing apparatus of claim 1, further comprising a shutter assembly configured to selectively move a shutter to expose the irradiator source to a surface upon which the floor curing apparatus operates.

4. The floor curing apparatus of claim 1, wherein the drive assembly is housed within a housing and the floor curing apparatus further comprises a power cord and a movable element configured to receive the power cord to maintain a portion of the power cord at an adjustable height above the housing.

5. The floor curing apparatus of claim 1, further comprising an operator control panel disposed above the drive assembly on an adjustable angle rigid element configured to be rotationally repositioned and locked using a pin and slot arrangement.

6. The floor curing apparatus of claim 1, wherein the plurality of rear wheels is positioned behind the drive assembly and irradiator source.

7. The floor curing apparatus of claim 1, wherein the irradiator source comprises an ultraviolet light source.

8. A floor curing apparatus comprising:
a housing;
an ultraviolet lamp located at a movable position relative to the housing; and
a plurality of forward wheel pairs and a plurality of rear wheels, the plurality of forward wheel pairs comprising a forward offset multiple wheel pair arrangement comprising:
a pair of inner drive wheels configured to be driven and rotate about a primary driveshaft aligned along a first common axis; and
a pair of outer drive wheels configured to be driven and rotate about a second common axis; and
an outer drive wheel drive mechanism configured to drive the pair of outer drive wheels and comprising two secondary driveshafts aligned along the second common axis, each secondary driveshaft rotated by a separate drive chain driven by rotation of the primary driveshaft;
wherein the pair of outer drive wheels are positioned outward from the pair of inner drive wheels, and the first common axis is offset from said second common axis by a predetermined distance.

9. The floor curing apparatus of claim 8, further comprising a plurality of bearings arranged with each inner drive wheel and each outer drive wheel to enable nonuniform rotation of the pair of outer drive wheels and the pair of inner drive wheels.

10. The floor curing apparatus of claim 8, further comprising a shutter assembly configured to selectively move a shutter to expose the ultraviolet lamp to a surface upon which the floor curing apparatus operates.

11. The floor curing apparatus of claim 8, wherein the floor curing apparatus further comprises a power cord and a movable element configured to receive the power cord to maintain a portion of the power cord at an adjustable height above the housing.

12. The floor curing apparatus of claim 8, further comprising an operator control panel disposed above the offset wheel arrangement on an adjustable angle rigid element configured to be rotationally repositioned and locked using a pin and slot arrangement.

13. The floor curing apparatus of claim 8, wherein the plurality of rear wheels is positioned behind the offset wheel arrangement and ultraviolet lamp.

14. A floor curing apparatus comprising:
an ultraviolet lamp positioned within a housing;
a plurality of forward wheel pairs and a plurality of rear wheels positioned on an underside of the housing, the plurality of forward wheel pairs comprising a forward offset multiple wheel pair arrangement comprising:
a pair of inner drive wheels configured to be driven and rotate about a first common axis; and
a pair of outer drive wheels configured to be driven and rotate about a second common axis; and
an outer drive wheel drive mechanism configured to drive the pair of outer drive wheels and comprising two secondary driveshafts aligned along the second common axis, each secondary driveshaft rotated by a separate drive chain driven by rotation of a primary driveshaft aligned along the first common axis;
wherein each outer drive wheel is positioned outward from each inner drive wheel, and the first common axis is offset from said second common axis by a distance.

15. The floor curing apparatus of claim 14, further comprising a plurality of bearings arranged with each inner drive wheel and each outer drive wheel to enable nonuniform rotation of the pair of outer drive wheels and the pair of inner drive wheels.

16. The floor curing apparatus of claim 14, further comprising a shutter assembly configured to selectively move a shutter to expose the ultraviolet lamp to a surface upon which the floor curing apparatus operates.

17. The floor curing apparatus of claim 14, wherein the floor curing apparatus further comprises a power cord and a movable element configured to receive the power cord to maintain a portion of the power cord at an adjustable height above the housing.

18. The floor curing apparatus of claim 14, further comprising an operator control panel disposed above the offset wheel arrangement on an adjustable angle rigid element configured to be rotationally repositioned and locked using a pin and slot arrangement.

19. The floor curing apparatus of claim 14, wherein the plurality of rear wheels is positioned behind the offset wheel arrangement and ultraviolet lamp.

* * * * *